United States Patent [19]

Edwards et al.

[11] Patent Number: 5,599,150
[45] Date of Patent: Feb. 4, 1997

[54] CLEVIS PIN RETAINER CLIPS

[75] Inventors: David J. Edwards, Shelby; Charles Giacomazza, Troy, both of Mich.

[73] Assignee: Rockwell International Corporation, Pittsburgh, Pa.

[21] Appl. No.: 299,218

[22] Filed: Aug. 31, 1994

Related U.S. Application Data

[63] Continuation of Ser. No. 53,740, Apr. 27, 1993, abandoned.

[51] Int. Cl.$^6$ ............................. F16B 21/14; F16B 21/18
[52] U.S. Cl. .......................... 411/530; 411/515; 411/351; 411/946
[58] Field of Search ..................................... 411/210, 211, 411/218–221, 351, 352, 513–516, 530, 945, 946; 403/316, 379

[56] References Cited

U.S. PATENT DOCUMENTS

| | | | |
|---|---|---|---|
| 1,799,934 | 4/1931 | Strid | 411/530 |
| 2,399,119 | 4/1946 | Howell | 411/530 |
| 3,255,654 | 6/1966 | Bleicher | 411/530 X |
| 3,263,552 | 8/1966 | Fischer | 411/530 |
| 4,205,586 | 6/1980 | MacNeill | 411/530 |
| 4,298,299 | 11/1981 | Quarles | 411/514 |
| 4,592,689 | 6/1986 | Leitzke | 411/530 X |
| 5,217,338 | 6/1993 | Czubek | 411/514 X |

FOREIGN PATENT DOCUMENTS

| | | | |
|---|---|---|---|
| 1356174 | 2/1964 | France | 411/515 |
| 1369526 | 7/1964 | France | 411/514 |
| 514655 | 11/1939 | United Kingdom | 411/515 |

*Primary Examiner*—Neill R. Wilson

[57] ABSTRACT

A hitch pin for maintaining a clevis pin in a bore including a continuous wire member formed to include a straight portion ending in a constant radius hinge portion. A parallel portion extends from the hinge portion to a constant radius barb portion. The termination of the barb portion is located on the side of the straight portion opposite the parallel portion and resiliently maintained there by properties of the hinge portion as accentuated by material properties of the wire itself. The hitch pin may be installed in a bore defined in a clevis pin by applying force to the hinge portion after inserting the leadin portion in the bore. During installation, the barb portion is resiliently deformed about the clevis pin and returns to a preinstalled position when the hitch pin installation has been completed. Any forces attempting to remove the hitch pin cause the barb portion to strike the clevis pin presenting a mechanical obstruction to removal.

2 Claims, 3 Drawing Sheets

CLEVIS PIN RETAINER CLIPS

This application is a continuation of application Ser. No. 08/053,740, filed Apr. 27, 1993, now abandoned.

BACKGROUND OF THE INVENTION

1. Field of the Invention

This invention relates to retention clips and, more specifically, retention clips featuring a resiliently displaceable barb.

2. Description of the Related Art

Clevis pins installed in bores are retained by use of cotter pins. Cotter pins require distortion subsequent to installation to accomplish mechanical retention thereof. Such an operation may be impaired if the clevis pin is located in a position which is difficult to reach. Further, the degree and manner of distortion may vary from operator to operator thus impairing the reliability of such an installation. The present invention assures consistency thereof despite the variety of positions which must be reached to accomplish installation.

SUMMARY OF THE PRESENT INVENTION

The present invention is a hitch pin for maintaining a clevis pin in a bore including a continuous wire member formed to include a straight portion ending in a constant radius hinge portion. A parallel portion extends from the hinge portion to a constant radius barb portion. The termination of the barb portion is located on the side of the straight portion opposite the parallel portion and resiliently maintained there by properties of the hinge portion as accentuated by material properties of the wire itself. The hitch pin may be installed in a bore defined in a clevis pin by applying force to the hinge portion after inserting the leadin portion in the bore. During installation, the barb portion is resiliently deformed about the clevis pin and returns to a preinstalled position when the hitch pin installation has been completed. Any forces attempting to remove the hitch pin cause the barb portion to strike the clevis pin presenting a mechanical obstruction to removal.

These and other aspects of the present invention will become more readily apparent by reference to the following detailed description of the embodiments as shown in the drawings.

DETAILED DESCRIPTION OF THE PREFERRED EMBODIMENT

Figure 1:
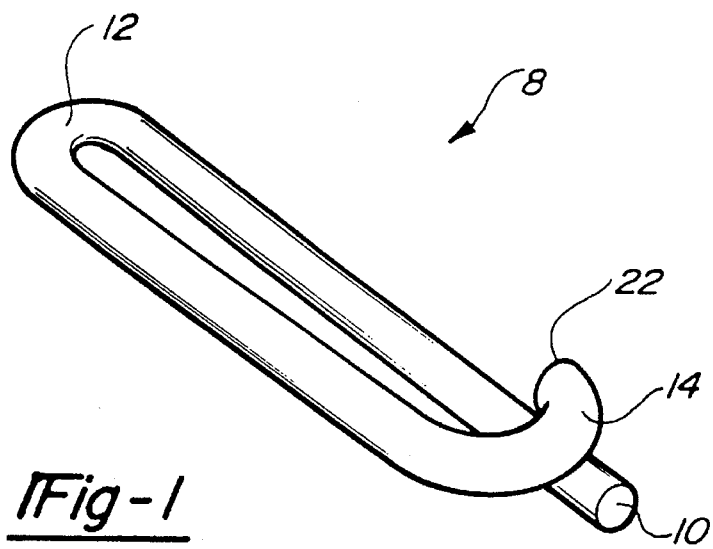
FIG. 1 is a perspective view of the preferred embodiment of the present invention.
Figure 2:
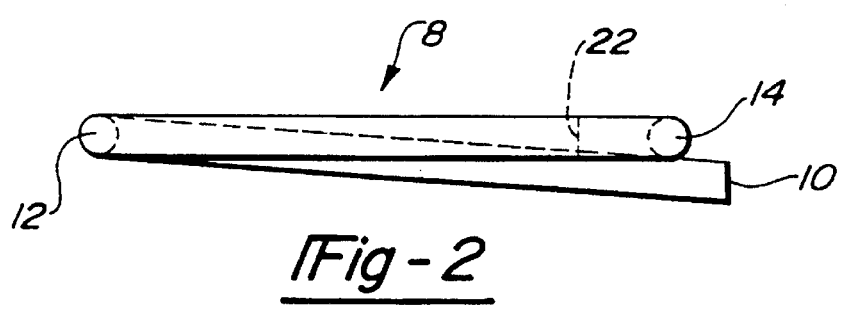
FIG. 2 is a side view of the present invention.
Figure 3:
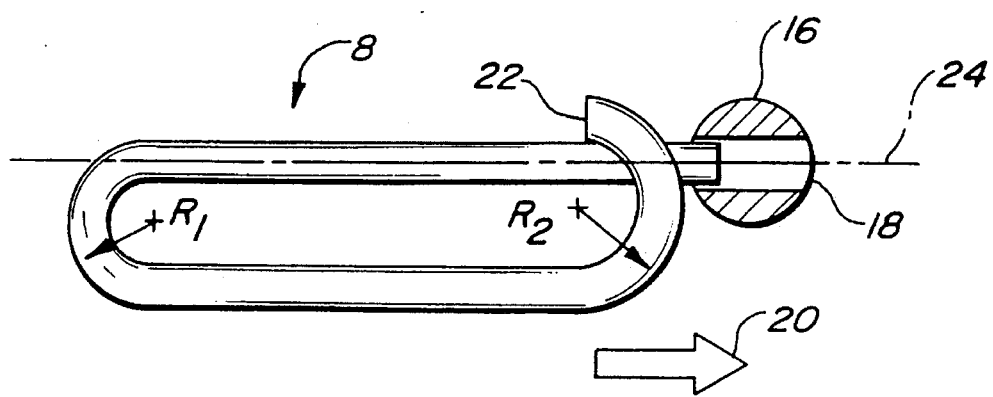
FIG. 3 is a plan view of the present invention in an initially installed position.
Figure 3A:
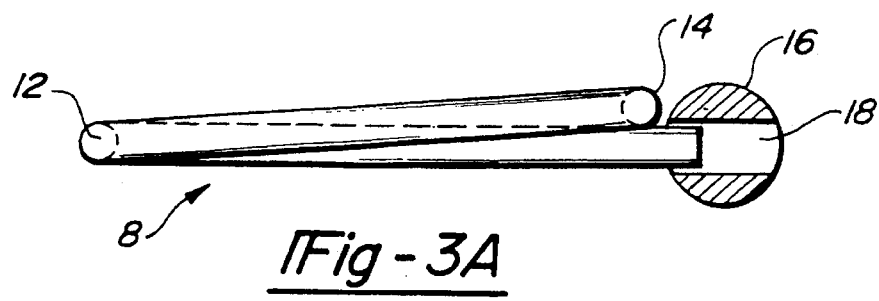
Figure 4:
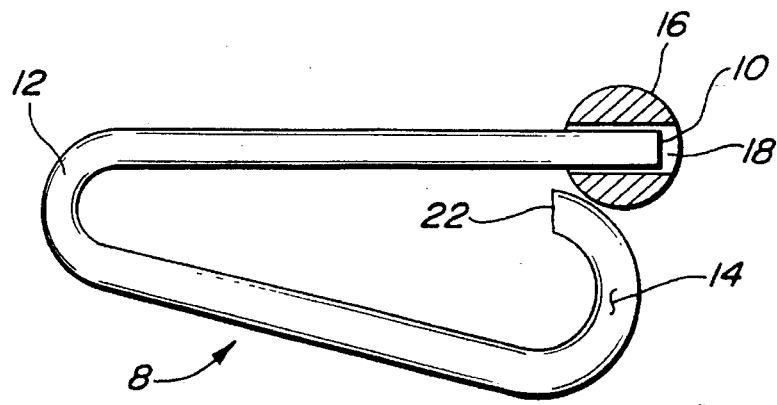
FIGS. 4, 4A and 4B are plan views of the present invention showing various stages of the midway installed position.
Figure 4A:
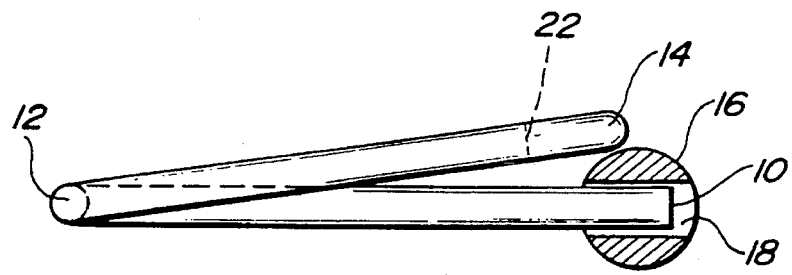
Figure 4B:
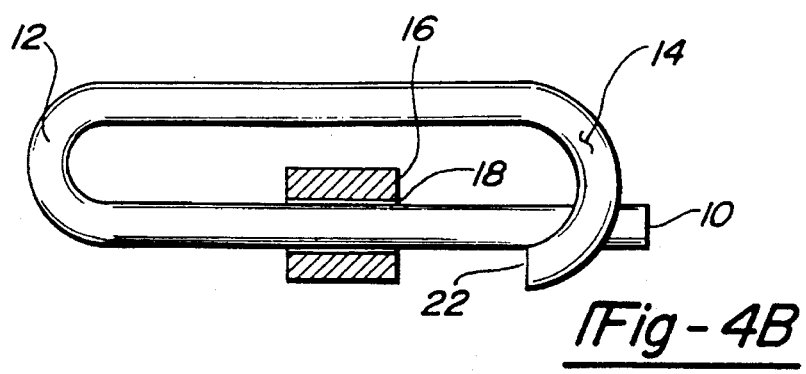
Figure 5:
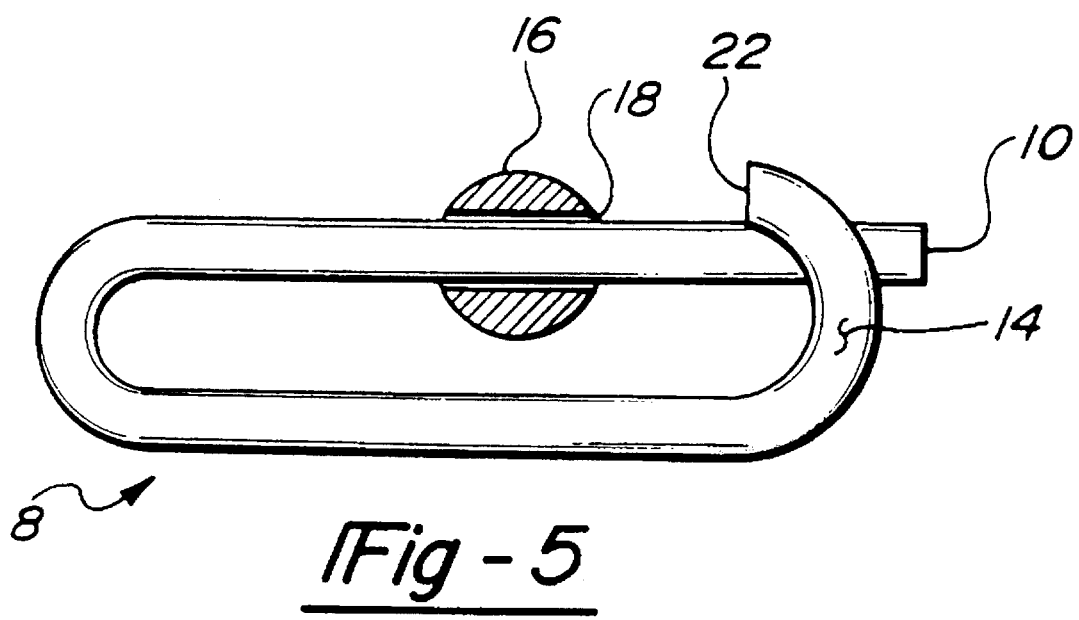
FIG. 5 is a plan view of the present invention completely installed.

The preferred embodiment of the present invention, as shown in FIGS. 1, 2 and 3 includes a hitch pin 8 formed from a wire shaped to provide a leadin 10, a hinge 12 and a barb 14. Hinge 12 may be formed as a constant radius curve $R_1$ defining a 180° bend of the wire and terminating at the end portion thereof. Barb termination 22 is located in a laterally displaced position from the axis of connection portion 24 which connects leadin 10 and hinge 12 by using a value of $R_2$ greater than $R_1$. Hitch pin 8 may be installed on clevis pin 16 through clevis pin hole 18 by first inserting leadin 10 through hole 18 and applying force in direction 20, as shown in FIG. 3. Barb 14 will be displaced about the outer radial curvature of clevis pin 16 as shown in FIG. 4. As shown in FIG. 5, hitch pin 8 will resist removal by the engagement of barb 14 against clevis pin 16. Forces from road debris or maldirected repair activities which strike hitch pin 8 will force barb 14 further outward maintaining the mechanical obstruction thereof which prevent removal of hitch pin 8. Alternatively, hitch pin 8 may be oriented 90° with respect to the position shown in FIG. 3 and as shown in FIG. 3A. During installation, barb 14 will be displaced about the outer radial curvature of clevis pin 16, as shown in FIG. 4A. FIG. 4B illustrates hitch pin 8 installed to a position in which barb 14 will resist removal by the engagement of barb 14 against clevis pin 16. Finally, hitch pin 8 may be rotated to the position shown in FIG. 5.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A hitch pin for engaging a clevis pin bore, comprising:

a continuous wire member formed to include a first end defining a lead-in;

a first intermediate member extending straight from said lead-in;

said first intermediate member terminating in a hinge portion having a substantially constant radius $R_1$ extending substantially 180°;

a second intermediate member extending straight from said hinge portion;

said second intermediate member terminating in a barb portion having a substantially constant radius $R_2$ extending substantially 180° to a termination, wherein $R_2$ is greater than $R_1$;

said hinge portion resiliently maintaining said barb portion such that the termination of said barb portion is disposed on a side of said first intermediate member opposite from said second intermediate member; and said barb portion disposed proximate said lead-in.

2. The hitch pin of claim 1 wherein said first intermediate member and said second intermediate member are substantially parallel.

* * * * *